US009646385B2

(12) United States Patent
Domanski et al.

(10) Patent No.: US 9,646,385 B2
(45) Date of Patent: May 9, 2017

(54) SYSTEM AND A METHOD FOR GENERATING A DEPTH MAP

(71) Applicant: POLITECHNIKA POZNANSKA, Poznan (PL)

(72) Inventors: Marek Domanski, Poznan (PL); Tomasz Grajek, Poznan (PL); Damian Karwowski, Poznan (PL); Krzysztof Klimaszewski, Poznan (PL); Olgierd Stankiewicz, Poznan (PL); Jakub Stankowski, Poznan (PL); Krzysztof Wegner, Murowana Goslina (PL)

(73) Assignee: POLITECHNIKA POZNANSKA, Poznan (PL)

( * ) Notice: Subject to any disclaimer, the term of this patent is extended or adjusted under 35 U.S.C. 154(b) by 119 days.

(21) Appl. No.: 14/665,004

(22) Filed: Mar. 23, 2015

(65) Prior Publication Data
US 2016/0275691 A1 Sep. 22, 2016

(30) Foreign Application Priority Data
Mar. 18, 2015 (PL) .......................................... 411631

(51) Int. Cl.
*G06T 15/00* (2011.01)
*G06K 9/46* (2006.01)
(Continued)

(52) U.S. Cl.
CPC .............. *G06T 7/0075* (2013.01); *G06K 9/52* (2013.01); *G06K 9/6201* (2013.01); *G06T 3/40* (2013.01);
(Continued)

(58) Field of Classification Search
CPC ................... G06T 7/0075; G06T 2207/10012
See application file for complete search history.

(56) References Cited

U.S. PATENT DOCUMENTS

2014/0029836 A1  1/2014  Keselman

FOREIGN PATENT DOCUMENTS

WO        98/03021 A1    1/1998

OTHER PUBLICATIONS

Marco Accame et al., Hierarchical Block Matching for Disparity Estimation in Stereo Sequences, IEEE publication, 1995, pp. 374-377.*

(Continued)

*Primary Examiner* — Brian P Werner
(74) *Attorney, Agent, or Firm* — Mark M. Friedman

(57) ABSTRACT

A computer-implemented system for generating a depth map for a pair of stereoscopic images, the system comprising a lower level processing arrangement and a higher level processing arrangement. The lower level processing arrangement comprises a search range estimation module receiving a reliability map and configured to determine a range of considered disparities in a higher level of processing wherein a decision regarding such range is taken based on the reliability map. The higher level processing arrangement comprises a depth map generation with reliability module receiving output of an image sections matching module configured to output a depth map and a reliability map wherein the reliability map comprises data on reliability, with which a disparity value has been determined for each point of the pair of stereoscopic images.

7 Claims, 6 Drawing Sheets

(51) Int. Cl.
*G06T 7/00* (2017.01)
*G06K 9/52* (2006.01)
*G06K 9/62* (2006.01)
*G06T 3/40* (2006.01)
*G06T 7/60* (2017.01)
*G06T 7/70* (2017.01)
*G06T 7/593* (2017.01)
*H04N 13/00* (2006.01)

(52) U.S. Cl.
CPC ............... *G06T 7/593* (2017.01); *G06T 7/60* (2013.01); *G06T 7/70* (2017.01); *G06T 7/97* (2017.01); *G06T 2200/04* (2013.01); *H04N 2013/0081* (2013.01)

(56) References Cited

OTHER PUBLICATIONS

Rueihung Li et al: "Disparity Search Range Estimation Based on Dense Stereo Matching" Industrial Electronics and Applications (ICIEA), Jun. 19, 2013, pp. 753-759, XP032442152.

Aaron F Bobick et al: "Large Occlusion Stereo" International Journal of Computer Vision, Sep. 1999, pgaes 181-200, XP055220307.

Zitnick c I et al: "A cooperative algorithm for stereo matching and occlusion detection", IEEE Transactions on Pattern Analysis and Machine Intelligence, IEEE Computer Society, USA, vol. 22, No. 7, Jul. 2000, ISSN: 0162-8828.

* cited by examiner

SYSTEM AND A METHOD FOR GENERATING A DEPTH MAP

TECHNICAL FIELD

The present invention relates to a system and method for generating a depth map. In particular, the present invention relates to generating a depth map with simultaneous verification of reliability of the determined disparity.

BACKGROUND

In three-dimensional (3D) computer graphics, a depth map is an image or an image channel that contains information relating to a distance of surfaces of scene objects from a viewpoint. The term is related to and may be analogous to a depth buffer, a Z-buffer, Z-buffering, a Z-depth and disparity. The term "Z" relates to a convention that the central axis of view of a camera is in the direction of the camera's Z axis, and not to the absolute Z axis of a scene.

Such depth map is an addition to the main image, typically a stereo pair, and needs to be usually generated from the stereo pair. The quality of this generation process in the end influences the users' perception of depth in cases where original stereo pair is blended with further graphical data such as on-screen display menus or video effects.

It would be thus advantageous to define a method of generating depth map, from a pair of stereoscopic images, with a simultaneous verification of the reliability of the determined disparity.

SUMMARY

There is disclosed a computer-implemented system for generating a depth map for a pair of stereoscopic images, the system comprising: a lower level processing arrangement comprising: a decimation module configured to decrease resolution of the pair of stereoscopic images by a factor of "a"; an image sections matching module, receiving the decimated pair of stereoscopic images configured to output information on matching cost, at appropriate disparities, to appropriate points of the other image from decimated pair of stereoscopic images; a depth map generation with reliability module receiving output of the image sections matching module configured to output a depth map and a reliability map wherein the reliability map comprises data on reliability, with which a disparity value has been determined for each point of the decimated pair of stereoscopic images; a disparity scaling module receiving the depth map and configured to upscale the image of the depth map and scale its values by a factor of "a"; a search range estimation module receiving the reliability map and configured to determine a range of considered disparities in the higher level of processing wherein a decision regarding such range is taken based on the reliability map; and a higher level processing arrangement comprising: an image sections matching module configured to search only a narrowed range of possible disparity as indicated by the input from the search range estimation module, of the lower level, wherein the image sections matching module receives the depth map from the disparity scaling module, of the lower level; a depth map generation with reliability module receiving output of the image sections matching module configured to output a depth map and a reliability map wherein the reliability map comprises data on reliability, with which a disparity value has been determined for each point of the pair of stereoscopic images.

The decision regarding the range can be taken based on the reliability map such that for points of the depth map having low reliability, the range of searched disparity equals to a full range while for points of the depth map having high reliability, the searched range is set to:

$$d \in (a*d_{current} - b | a*d_{current} + b)$$

wherein 'a' is the depth upscale value and 'b' is a range extension value.

The system may comprise a further level of processing arrangement, comprising the same modules as the lower level of processing arrangement, whereas the lower level processing arrangement becomes its higher level processing arrangement; wherein the decimated pair of stereoscopic images is input to the decimation module of the further level of processing arrangement; wherein the image sections matching module is configured to search only a narrowed range of possible disparity as indicated by the input from the search range estimation module of the further level of processing arrangement; and wherein the image sections matching module receives the depth map from the disparity scaling module of the further level of processing arrangement.

The depth map generation with reliability module can be configured to execute a WTA (Winner Takes All) method in order to determine a depth map of the input stereoscopic images pair.

The depth map generation with reliability module can be configured to execute a reliability map determination based on counting a number of collisions during synthesis of a virtual image, wherein points for which the number of collisions is high are less reliable than points, which do not have collisions or for which the number of collisions is lower wherein a collision is present when at least two points, of an input image, are projected to the same point of the virtual image.

Said counting of the number of collisions can be executed as follows: determining for each point p of the depth map having a depth value of d, a position vp corresponding to the given point in the virtual image, using points projection according to the following formula:

$$vp = F(p, d) \qquad \text{(Eq. 1)}$$

wherein the function F is defined as an equation defining a 3D projection of points in space;
calculating the vp position in order to increase a counter of points that have been projected into the vp position in the virtual image; assigning, for each point p of the depth map, a reliability value as a function of the value at position vp.

There is also disclosed a computer-implemented method for generating a depth map for a pair of stereoscopic images, the method comprising the steps of: decimating a pair of stereoscopic images N−1 times; assuming, at level N−1, for each point a reliability equal to 0 ($w_{N-1}=0$) and a disparity equal to 0 ($d_{N-1}=0$); at each level L in the range from N−1 to 0, for each point: determining a disparity search range based on a reliability map wherein if a reliability value is below a threshold ($w_L < th_{wL}$) the disparity search range is set to the full available range ($zd_L(x, y)$=from $D_{Lmin}$ to $D_{Lmax}$) and otherwise, if a reliability value is above the threshold ($w_L > th_{wL}$) the disparity search range is narrowed; applying a method for determining depth, which for each point considers only disparities from a range defined by the range $zd_L$ and generates a disparity map $d_L$; if the level L>0, upscaling the determined disparity map $d_L$ to the image size at the level L−1, thereby obtaining a disparity map $d_{L-1}$ and determining a reliability map $w_{L-1}$ based on the $d_{L-1}$ disparity map.

Determining of the disparity map may comprise the steps of: storing in a table, for different disparity values, values of a match metric for successive points of a given image line; for each point of an image, searching a first best value of disparity, at which match error, stored in the table, is the lowest; and selecting the disparity value having the smallest match error from values of the table present on a diagonal crossing the cell comprising the first best value.

There is also disclosed a computing device program product for generating a depth map for a pair of stereoscopic images, the computing device program product comprising: a non-transitory computer readable medium; first programmatic instructions for decimating a pair of stereoscopic images N−1 times; second programmatic instructions for assuming, at level N−1, for each point a reliability equal to 0 ($w_{N-1}$=0) and a disparity equal to 0 ($d_{N-1}$=0); third programmatic instructions for, at each level L in the range from N−1 to 0, for each point: determining a disparity search range based on a reliability map wherein if a reliability value is below a threshold ($w_L < th_{wL}$) the disparity search range is set to the full available range ($zd_L$(x, y)=from $D_{Lmin}$ to $D_{Lmax}$) and otherwise, if a reliability value is above the threshold ($w_L > th_{wL}$) the disparity search range is narrowed; applying a method for determining depth, which for each point considers only disparities from a range defined by the range $zd_L$ and generates a disparity map $d_L$; if the level L>0, upscaling the determined disparity map $d_L$ to the image size at the level L−1, thereby obtaining a disparity map $d_{L-1}$ and determining a reliability map $w_{L-1}$ based on the $d_{L-1}$ disparity map.

BRIEF DESCRIPTION OF THE DRAWINGS

These and other objects of the invention presented herein are accomplished by providing a system and method for generating a depth map. Further details and features of the present invention, its nature and various advantages will become more apparent from the following detailed description of the preferred embodiments shown in a drawing, in which.

NOTATION AND NOMENCLATURE

Some portions of the detailed description which follows are presented in terms of data processing procedures, steps or other symbolic representations of operations on data bits that can be performed on computer memory. Therefore, a computer executes such logical steps thus requiring physical manipulations of physical quantities.

Usually these quantities take the form of electrical or magnetic signals capable of being stored, transferred, combined, compared, and otherwise manipulated in a computer system. For reasons of common usage, these signals are referred to as bits, packets, messages, values, elements, symbols, characters, terms, numbers, or the like.

Additionally, all of these and similar terms are to be associated with the appropriate physical quantities and are merely convenient labels applied to these quantities. Terms such as "processing" or "creating" or "transferring" or "executing" or "determining" or "detecting" or "obtaining" or "selecting" or "calculating" or "generating" or the like, refer to the action and processes of a computer system that manipulates and transforms data represented as physical (electronic) quantities within the computer's registers and memories into other data similarly represented as physical quantities within the memories or registers or other such information storage.

A computer-readable (storage) medium, such as referred to herein, typically may be non-transitory and/or comprise a non-transitory device. In this context, a non-transitory storage medium may include a device that may be tangible, meaning that the device has a concrete physical form, although the device may change its physical state. Thus, for example, non-transitory refers to a device remaining tangible despite a change in state.

As utilized herein, the term "example" means serving as a non-limiting example, instance, or illustration. As utilized herein, the terms "for example" and "e.g." introduce a list of one or more non-limiting examples, instances, or illustrations.

DETAILED DESCRIPTION

An object of the present invention is a hierarchical method for generating a depth map with its simultaneous reliability check. Based on the provided reliability parameter, on each hierarchy level, there is narrowed down a range of searched disparities.

The present invention defines a reliability determination method. This method may be employed together with a prior art depth map generation method. Optionally, the system employs a new method for generating a depth map, which is supplied with a novel reliability determination method.

Figure 1:
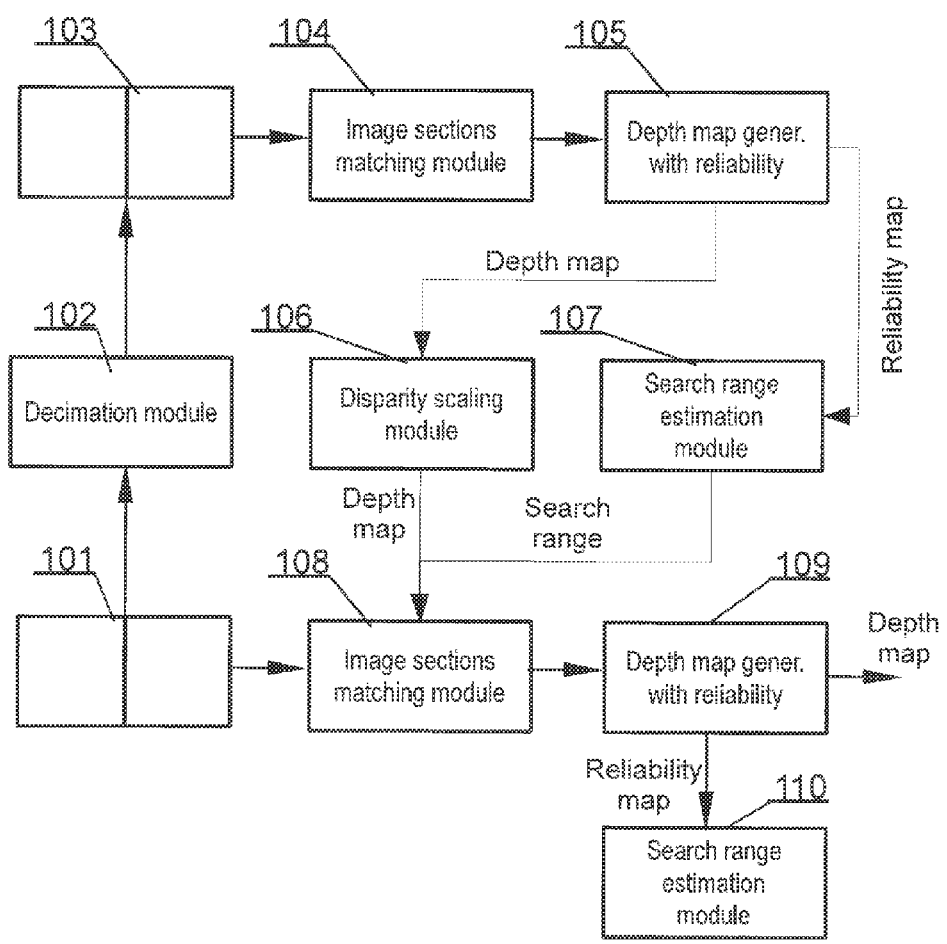
FIG. 1 presents a diagram of the system according to the present invention.

FIG. 1 presents a diagram of the system according to the present invention. An input stereoscopic images pair 101 is fed into a decimation module 102. The decimation process decreases image resolution by "a" times. The stereoscopic images pair 101 may be in different formats such as a top-bottom or a left-right or may comprise fully separate first image data and second image data.

The decimated stereoscopic images pair 103 is fed into an image sections (also referred to as fragments or blocks) matching module 104. Such process may be implemented according to a method disclosed in the publication "A Taxonomy and Evaluation of Dense Two-Frame Stereo Correspondence Algorithms" by Daniel Scharstein and Richard Szeliski (international Journal of Computer Vision, 47 (1/2/3):7-42, April-June 2002).

Subsequently, information on matching cost, at appropriate disparities to appropriate points of the other image from a stereo pair, is input to a module for depth map generation with reliability 105. An output of this module is a depth map and a reliability map.

The reliability map comprises data on certainty (reliability), with which a disparity value (depth) has been determined for each point.

The output depth map is input to a disparity scaling module 106, which upscales the image of the depth map and scales its values m-times (in case of disparities they are multiplied by the decimation factor "a" applied by the decimation module 102).

The output reliability map is input to a search range estimation module 107. This module determines a range of considered disparities in the subsequent stage of resolution(s) hierarchy. A decision regarding such range is taken based on the reliability map of a depth map generated for current resolution of the input images 103, 101.

For points of the depth map having low reliability, the range of searched disparity equals to a full range (for example 0 to 63). However, for points of the depth map having high reliability, the searched range is set to:

$$d \in (a*d_{current}-b | a*d_{current}+b)$$

wherein 'a' is typically one or the decimator's scale and 'b' is a range extension value eg. the decimator's scale. In a preferred embodiment a=1 and b=2. Increase of the b coefficient will decrease probability of determining a false disparity value while increasing computation time.

On the next level of processing 108-109, for each point, there is searched only the disparity search range determined by the lower-ranking search range estimation module 107. The higher level image sections matching module (108) searches only a narrowed range of possible disparity. Thus, the higher level module for depth map generation with reliability (109) outputs a final depth map as well as a final reliability map.

In another embodiment, the number of hierarchy levels may be increased, by similarly adding another level of decimation of the stereo pair 103 and appropriate processing path 102-107.

Such another hierarchy level may be referred to as a further level of processing arrangement wherein the decimated pair of stereoscopic images 103 is input to the decimation module of the further level of processing arrangement. In such a case the image sections matching module (104) is configured to search only a narrowed range of possible disparity as indicated by the input from the search range estimation module of the further level of processing arrangement; and the image sections matching module (104) receives the depth map from the disparity scaling module of the further level of processing arrangement.

Typically such system comprises 4 to 5 decimation levels such that a pair of images having lowest resolution (due to decimation) causes that the range of searched disparities (which decreases, at successive levels of the decimation cascade, by the decimation scale factor "a") is sufficiently low eg. 2 or 4 i.e. at the lowest level (lowest resolution) there is obtained a disparity range from 0 to 2 or 4 and at the higher levels the disparity range is appropriately greater.

The system may be realized using dedicated components or custom made FPGA or ASIC circuits. The system comprises a data bus communicatively coupled to a memory. Additionally, other components of the system are communicatively coupled to the system bus so that they may be managed by a controller.

The memory may store computer program or programs executed by the controller in order to execute steps of the method according to the present invention.

The module for depth map generation with reliability 105, 109 may be implemented according to the two following embodiments.

First Embodiment

A known WTA (Winner Takes All) or similar method may be used to determine a depth map and supplement it with a reliability determination module according to the present invention.

In the WTA method, for each image point there is sought a disparity. The algorithm compares two images (stereo pair) successively assuming different values of the disparity. For a given image point, the method compares the first-image point to a point of the second image shifted by a value of the tested disparity. The values of match metric for successive values of disparity are stored in an array. The disparity for a given point of the image with the smallest error (the smallest match error) is selected as the value of disparity of the given point.

In a reliability map determination method, the present invention applies counting a number of collisions during synthesis of a virtual image, where points for which the number of collisions is high are less reliable than points, which do not have collisions (or the number of collisions is lower). A collision is present when at least two points, of an input image, are projected to one point of the virtual image. A typical high number of collisions is above 4 while a typical low number of collisions is 0 or 1.

Figure 2:
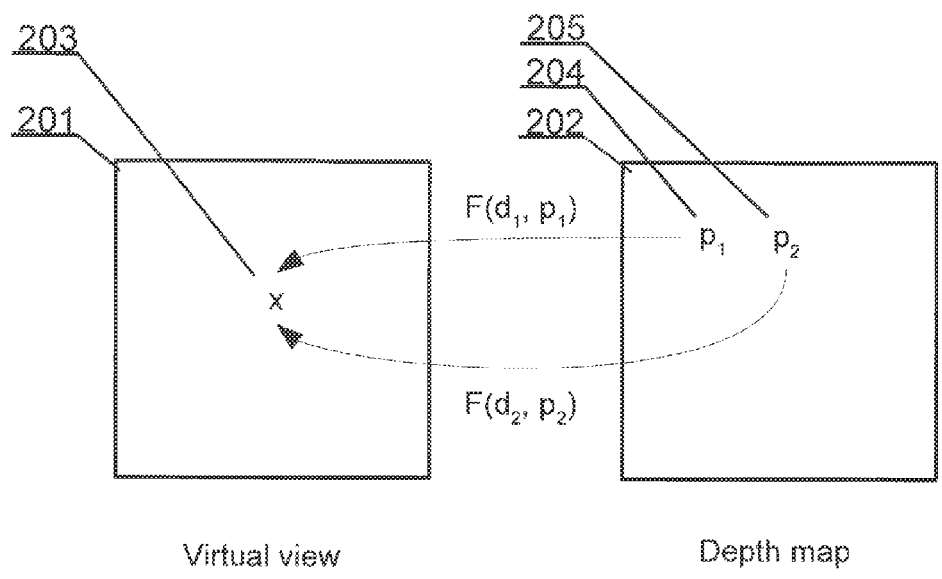
FIG. 2 shows a collision during synthesis of a virtual image.

FIG. 2 presents a collision during synthesis of a virtual image. There are two views: a virtual view 201 and a depth map view 202. More than one point 204, 205 may be mapped to a single point 203 in the virtual view. This may happen as a result of a process presented in FIG. 3.

Figure 3:
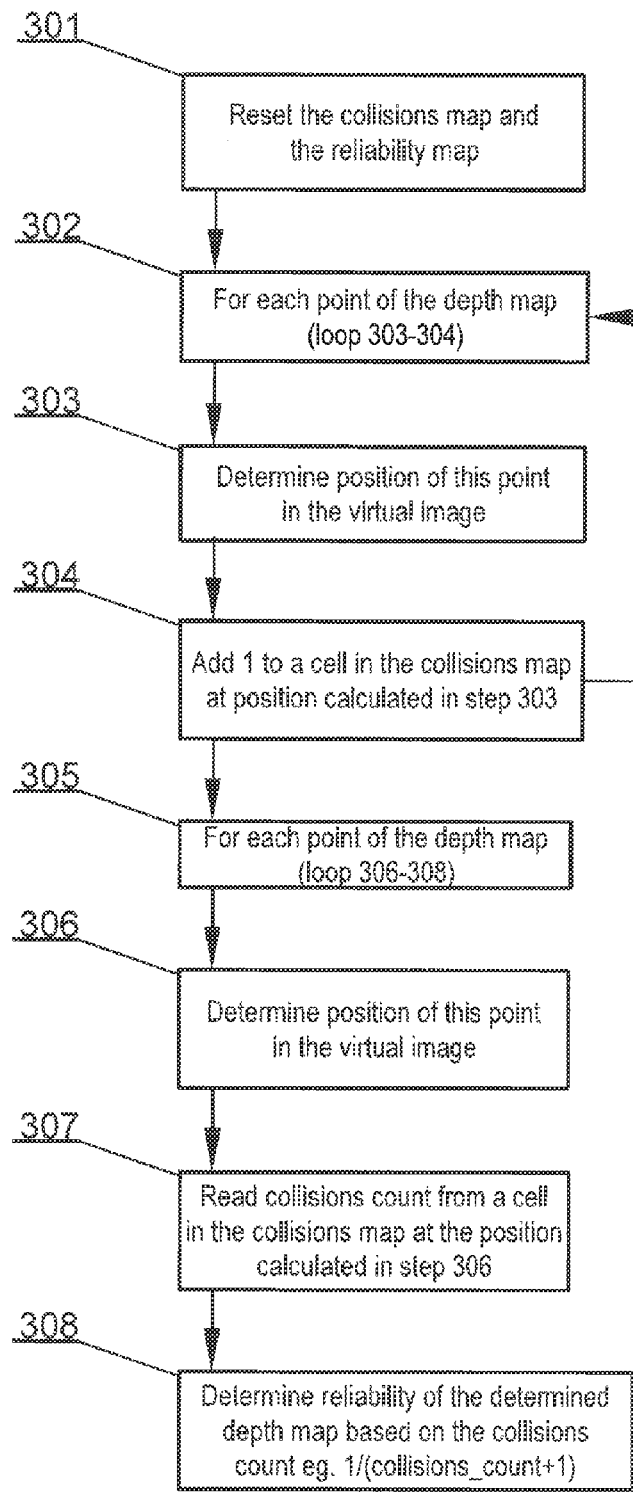
FIG. 3 presents a process of generating a reliability map.

FIG. 3 presents a diagram of the method for determining a reliability map according to the present invention. Before executing the following steps the collisions map and the reliability map are reset in step 301, for example set to zeros. The method determines in step 302, for each point p of the depth map having a depth value of d, a position vp corresponding to the given point in a virtual image, using points projection according to the following formula:

$$vp = F(p,d) \quad \text{(Eq. 1)}$$

wherein the function F is defined eg. an equation defining a 3D projection of points in space:

$$F(p,d) = z(d,p)*A*p + T \quad \text{(Eq. 2)}$$

wherein z(d,p) is a function determining a distance of a point p from a camera, whereas a depth value is d eg. depth in a format of normalized disparity witch can be denormalization through equation.

$$z(d,p) = \frac{1}{\frac{d}{255}\left(\frac{1}{z_{near}} - \frac{1}{z_{far}}\right) - \frac{1}{z_{far}}} \quad \text{(Eq. 3)}$$

Typically, the values of z (distance) have a great dynamic, eg. from 1 m to 100 m and their storage with a small number of bits would be difficult. Instead of storing distance information there is stored disparity information. The disparity is in relation to the distance as z=b*f/d where b is the distance between cameras used to record images of the stereo pair and f is the focal length of the camera lens. Values of b and f are associated with a given, unique camera system. Instead using value f and b with are not general, values of $z_{near}$ and $z_{far}$ have been used, with results in Eq. 3

The vp position is calculated in step 303 in order to increase in step 304 a counter of pixelCountMap of points that have been projected into the vp position in the virtual image.

Next, for each point p of the depth map, there is assigned a reliability value as a function of the value of counter pixelCountMap read in step 307 on position vp determined in step 306 using Eq. 1. Thus a reliability map is obtained, denoted as relabilityMap. The function of the value of counter pixelCountMap, read in step 307, may be defined as follows: 1/(collisions_count+1).

A pseudocode for this process may be implemented in computer software as follows:

```
Memset(pixelCountMap, dx*dy, 0);
Memset(relabilityMap, dx*dy, 0);
for(int y=0 ; y<dy; y++)
  for (int x=0 ; x<dx; x++)
  {
  PixelPosition vp = Project(x,y,Depth[y][x]) ;
  pixelCountMap[vp.y][vp.x]++ ;
  }
for(int y=0; y<dy; y++)
  for(int x=0; x<dx; x++)
  {
  PixelPosition vp = Project (x, y, Depth[y][x]) ;
  relabilityMap[y][x] = 1 / (pixelCountMap[vp.y][vp.x]+1) ;
  }
```

Figure 4:
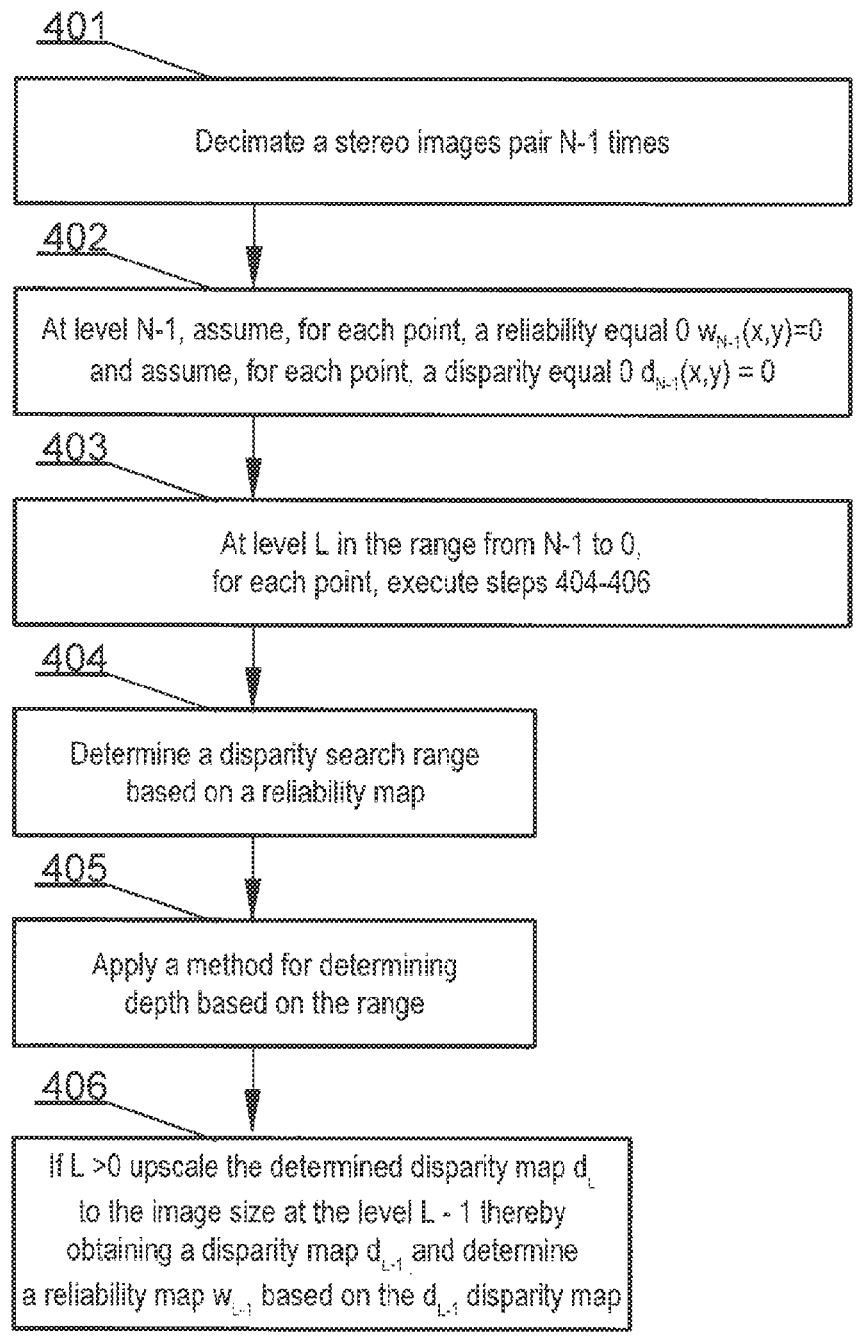
FIG. 4 presents a method diagram implemented in the system depicted in FIG. 1.

FIG. 4 presents a method diagram implemented in the system depicted in FIG. 1. The method starts in step 401 from decimating a stereo images pair N−1 times by a factor of a. Next, at level N−1, there is assumed in step 402 for each point a reliability equal to 0 (i.e. $w_{N-1}(x,y)=0$) and a disparity equal to 0 (i.e. $d_{N-1}(x,y)=0$).

Subsequently, at level L in the range from N−1 to 0 determined in step 403, for each point there are executed steps 404-406.

In step 404 there is determined a disparity search range based on a reliability map. If a reliability is below a threshold (i.e. $w_L(x,y)<thw_L$) the disparity search range is set to the full available range $zd_L(x,y)=$from $D_{Lmin}$ to $D_{Lmax}$, where $D_{Lmin}$, and $D_{Lmax}$ are a user-defined values of disparity range to search at level L (i.e. $D_{Lmin}=0$ i $D_{Lmax}=2^{N-L}$). Otherwise, if a reliability is above the threshold (i.e. $w_L(x,y)>th_{wL}$) the disparity search range is set to the following formula: $zd_L(x,y)-a_L*d_L(x,y)+-b_L$ (wherein $a_L$ may be one and $b_L$ may be a scale of the used decimator).

Subsequently, in step 405 there is applied a method for determining depth, which for each point will consider only disparities from a range defined by the range $zd_L$ and will generate a updated disparity map $d_L$.

Finally, in step 406, if the level L>0, the determined disparity map $d_L$ is upscaled to the image size at the level L−1 thereby obtaining a disparity map $d_{L-1}$ and determine a reliability map $w_{L-1}$ based on the $d_{L-1}$ disparity map.

Second Embodiment

This embodiment extends the known WTA depth map generation method. Values of a match metric for successive points of a given image line are, for different disparity values, stored in a table.

Figure 5:
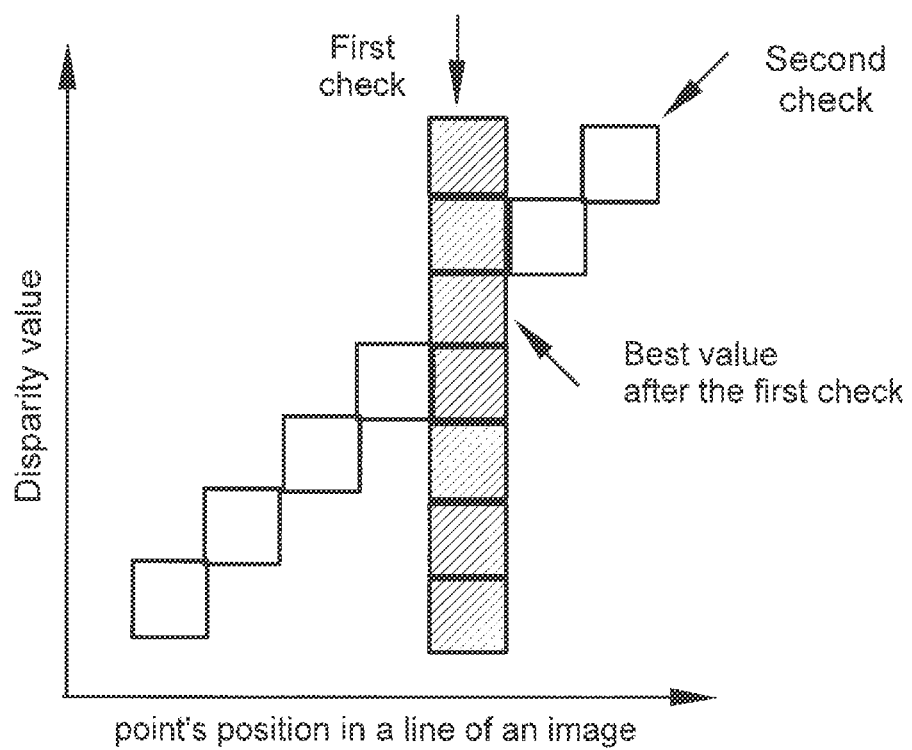
FIG. 5 presents a method of two-pass determination of a disparity value for a given image point.

FIG. 5 presents a method of two-pass determination of a disparity value for a given image point. For each point of an image, there is searched a value of disparity, at which match error, stored in the table, is the lowest—"first check". As a result there is obtained "the best value in the first check".

Thereafter, there is selected the best disparity value (having the smallest match error) from values of the table present on a diagonal crossing the cell comprising "the best value in the first check"—so called "second check".

If the obtained disparity value (having the smallest match error) equals "the best value in the first check", then the determined disparity value is characterized by a high reliability level. Otherwise, the reliability level is low. The reliability value is put on the reliability map.

Figure 6:
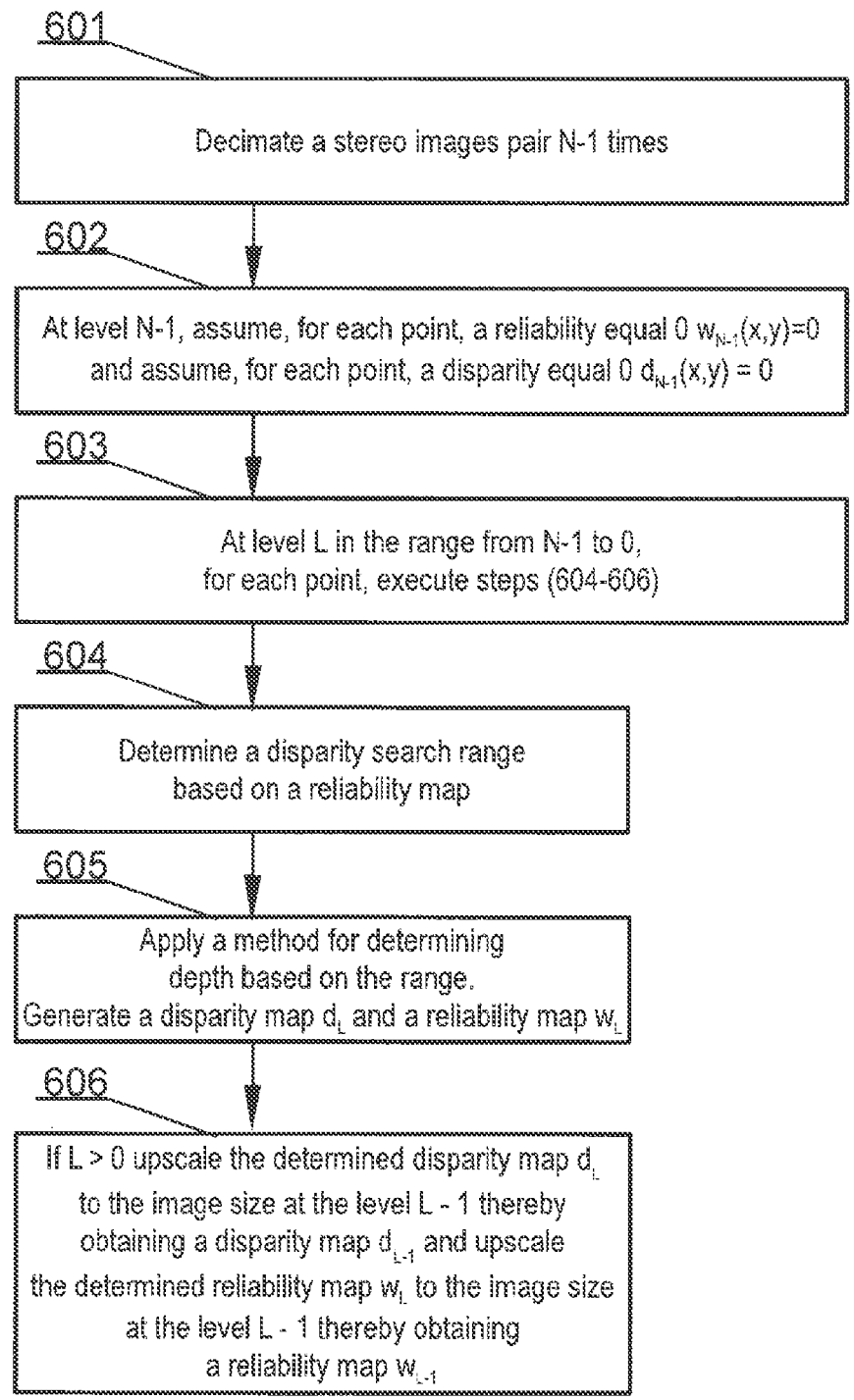
FIG. 6 presents the two-pass method diagram implemented in the system depicted in FIG. 1

FIG. 6 presents a method diagram implemented in the system depicted in FIG. 1 applying the second embodiment. The method starts in step 601 from decimating a stereo images pair N−1 times by a factor of a. Next, at level N−1, there is assumed 602 for each point a reliability equal to 0 (i.e. $w_{N-1}(x,y)=0$) and a disparity equal to 0 (i.e. $d_{N-1}(x,y)=0$).

Subsequently, at level L in the range from N−1 to 0 determined in step 603, for each point there are executed steps 604-606.

In step 604 there is determined a disparity search range based on a reliability map. If a reliability is below a threshold (i.e. $w_L(x,y)<thw_L$) the disparity search range is set to the full available range $zd_L(x,y)=$from $D_{Lmin}$ to $D_{Lmax}$, where $D_{Lmin}$ and $D_{Lmax}$ are a user-defined values of disparity range to search at level L (i.e. $D_{Lmin}=0$ i $D_{Lmax}=2^{N-L}$). Otherwise, if a reliability is above the threshold (i.e. $w_L(x,y)<thw_L$) the disparity search range is set to the following formula: $zd_L(x,y)=a_L*d_L(x,y)+-b_L$ (wherein $a_L$ may be a one and $b_L$ may be a scale of the used decimator).

Subsequently, in step 605, there is applied a method for determining depth, which for each point will consider only disparities from a range defined by the range $zd_L$ and will generate a updated disparity map $d_L$ and a reliability map $w_L$.

Finally, in step 606 if L>0 the determined disparity map $d_L$ is upscaled to the image size at the level L−1 thereby obtaining a disparity map $d_{L-1}$ and reliability map $w_L$ is upscaled to the image size at the level L−1 thereby obtaining a reliability map $w_{L-1}$.

The invention improves on image data generation in stereoscopic systems. Therefore, the invention provides a useful, concrete and tangible result.

Advantages obtained by application of the present invention include acceleration of depth map generation, possibility of determining a reliability map for a depth map while applications of the present invention include free-view television, stereoscopic video or 3D scanners.

The present invention processes pairs of stereoscopic images in order to obtain a reliable depth map data. An implementation in a particular machine has been disclosed in the foregoing specification. Thus the machine or transformation test is fulfilled and that the idea is not abstract.

It can be easily recognized, by one skilled in the art, that the aforementioned method for generating a depth map may be performed and/or controlled by one or more computer programs. Such computer programs are typically executed by utilizing the computing resources in a computing device. Applications are stored on a non-transitory medium. An example of a non-transitory medium is a non-volatile memory, for example a flash memory while an example of a volatile memory is RAM. The computer instructions are executed by a processor. These memories are exemplary recording media for storing computer programs comprising computer-executable instructions performing all the steps of the computer-implemented method according the technical concept presented herein.

While the invention presented herein has been depicted, described, and has been defined with reference to particular preferred embodiments, such references and examples of implementation in the foregoing specification do not imply any limitation on the invention. It will, however, be evident that various modifications and changes may be made thereto without departing from the broader scope of the technical concept. The presented preferred embodiments are exemplary only, and are not exhaustive of the scope of the technical concept presented herein.

Accordingly, the scope of protection is not limited to the preferred embodiments described in the specification, but is only limited by the claims that follow.

The invention claimed is:

1. A computer-implemented system for generating a depth map for a pair of stereoscopic images, the system comprising:
 a lower level processing arrangement comprising:
  a decimation module configured to decrease resolution of the pair of stereoscopic images by a factor of "a";
  an image sections matching module, receiving the decimated pair of stereoscopic images configured to output information on matching cost, at appropriate disparities, to appropriate points of the other image from decimated pair of stereoscopic images;
  a depth map generation with reliability module receiving output of the image sections matching module configured to output a depth map and a reliability map wherein the reliability map comprises data on reliability, with which a disparity value has been determined for each point of the decimated pair of stereoscopic images;
  a disparity scaling module receiving the depth map and configured to upscale the image of the depth map and scale its values by a factor of "a";
  a search range estimation module receiving the reliability map and configured to determine a range of considered disparities in the higher level of processing wherein a decision regarding such range is taken based on the reliability map;
 and a higher level processing arrangement comprising:
  an image sections matching module configured to search only a narrowed range of possible disparity as indicated by the input from the search range estimation module, of the lower level, wherein the image sections matching module receives the depth map from the disparity scaling module, of the lower level;
  a depth map generation with reliability module receiving output of the image sections matching module configured to:
   execute a reliability map determination based on counting a number of collisions during a synthesis of a virtual image, wherein points for which the number of the collisions is high are less reliable than points, which do not have the collisions or for which the number of the collisions is lower, wherein the collision is present when at least two points, of an input image, are projected to the same point of the virtual image; and
   output a depth map and a reliability map wherein the reliability map comprises data on reliability, with which a disparity value has been determined for each point of the pair of stereoscopic images.

2. The system according to claim 1, wherein the decision regarding the range is taken based on the reliability map such that for points of the depth map having low reliability, the range of searched disparity equals to a full range while for points of the depth map having high reliability, the searched range is set to:

$$d \in (a*d_{current} - b | a*d_{current} + b)$$

wherein 'a' is the depth upscale value and 'b' is a range extension value.

3. The system according to claim 1, comprising a further level of processing arrangement, comprising the same modules as the lower level of processing arrangement, whereas the lower level processing arrangement becomes its higher level processing arrangement
 wherein the decimated pair of stereoscopic images is input to the decimation module of the further level of processing arrangement;
 wherein the image sections matching module is configured to search only a narrowed range of possible disparity as indicated by the input from the search range estimation module of the further level of processing arrangement; and
 wherein the image sections matching module receives the depth map from the disparity scaling module of the further level of processing arrangement.

4. The system according to claim 1, wherein the depth map generation with reliability module is configured to execute a WTA (Winner Takes All) method in order to determine a depth map of the input stereoscopic images pair.

5. The system according to claim 1, wherein said counting of the number of collisions is executed as follows:
 determining for each point p of the depth map having a depth value of d, a position vp corresponding to the given point in the virtual image, using points projection according to the following formula:

$$vp = F(p,d) \qquad \text{(Eq. 1)}$$

wherein the function F is defined as an equation defining a 3D projection of points in space;
 calculating the vp position in order to increase a counter of points that have been projected into the vp position in the virtual image;
 assigning, for each point p of the depth map, a reliability value as a function of the value at position vp.

6. A computer-implemented method for generating a depth map for a pair of stereoscopic images, the method comprising the steps of:
 decimating a pair of stereoscopic images N-1 times;
 assuming, at level N-1, for each point a reliability equal to 0 ($w_{N-1}$ =0) and a disparity equal to 0 ($d_{N-1}$ =0);
 at each level L in the range from N-1 to 0, for each point:
  determining a disparity search range based on a reliability map wherein if a reliability value is below a threshold ($w_L < th_{wL}$) the disparity search range is set to the full available range ($zd_L$ (x, y) =from $D_{Lmin}$ to $D_{Lmax}$) and otherwise, if a reliability value is above the threshold ($w_L >_{wL}$) the disparity search range is narrowed;
  applying a method for determining depth, which for each point considers only disparities from a range defined by the range $zd_L$ and generates a disparity map $d_L$ by;
   storing in a table, for different disparity values, values of a match metric for successive points of a given image line;
   for each point of an image, searching a first best value of the disparity, At which a match error, stored in the table, is the lowest; and
   selecting the disparity value having the smallest match error from the values of the table present on a diagonal crossing the cell comprising the first best value;
  if the level L>0, upscaling the determined disparity map $d_L$ to the image size at the level L-1, thereby obtaining a disparity map $d_{L-1}$ and determining a reliability map $w_{L-1}$ based on the $d_{L-1}$ disparity map.

7. A computing device program product for generating a depth map for a pair of stereoscopic images, the computing device program product comprising:

a non-transitory computer readable medium;

first programmatic instructions for decimating a pair of stereoscopic images N-1 times;

second programmatic instructions for assuming, at level N-1, for each point a reliability equal to 0 ($w_{N-1}=0$) and a disparity equal to 0 ($d_{N-1}=0$);

third programmatic instructions for, at each level L in the range from N-1 to 0, for each point:

determining a disparity search range based on a reliability map wherein if a reliability value is below a threshold ($w_L < th_{wL}$) the disparity search range is set to the full available range ($zd_L(x, y)$ =from $D_{Lmin}$ to $D_{Lmax}$) and otherwise, if a reliability value is above the threshold ($w_L > th_{wL}$) the disparity search range is narrowed;

applying a method for determining depth, which for each point considers only disparities from a range defined by the range $zd_L$ and generates a disparity map $d_L$ by:

storing in a table, for different disparity values, values of a match metric for successive points of a given image line;

for each point of an image, searching a first best value of the disparity, at which a match error, stored in the table, is the lowest; and selecting the disparity value having the smallest match error from the values of the table present on a diagonal crossing the cell comprising the first best value;

if the level L>0, upscaling the determined disparity map $d_L$ to the image size at the level L−1, thereby obtaining a disparity map $D_{L-1}$ and determining a reliability map $w_{L-1}$ based on the $d_{L-1}$ disparity map.

* * * * *